US008224547B2

(12) United States Patent
Kang

(10) Patent No.: US 8,224,547 B2

(45) Date of Patent: Jul. 17, 2012

(54) DEVICE FOR PREVENTING SUDDEN ACCELERATION OF AUTOMOBILE

(76) Inventor: Mi Young Kang, Uijeongbu (KR)

(*) Notice: Subject to any disclaimer, the term of this patent is extended or adjusted under 35 U.S.C. 154(b) by 61 days.

(21) Appl. No.: 12/840,744

(22) Filed: Jul. 21, 2010

(65) Prior Publication Data

US 2011/0155099 A1 Jun. 30, 2011

(30) Foreign Application Priority Data

Dec. 24, 2009 (KR) ........................ 10-2009-0130743

(51) Int. Cl.
*G05D 1/00* (2006.01)
*B60T 7/12* (2006.01)
*F02D 9/08* (2006.01)
*F02D 41/00* (2006.01)

(52) U.S. Cl. ............. 701/76; 701/84; 132/337; 132/361

(58) Field of Classification Search .................. 123/337, 123/376, 403, 342, 361, 394–398, 400, 402; 701/70, 76, 82, 84, 85; 180/197
See application file for complete search history.

(56) References Cited

U.S. PATENT DOCUMENTS

| | | | | |
|---|---|---|---|---|
| 4,785,691 | A * | 11/1988 | Papenhagen et al. | 477/107 |
| 4,873,957 | A * | 10/1989 | Ueyama et al. | 123/399 |
| 5,035,218 | A * | 7/1991 | Takeuchi et al. | 123/361 |
| 5,040,507 | A * | 8/1991 | Hayes et al. | 123/339.2 |
| 5,040,508 | A * | 8/1991 | Watanabe | 123/396 |
| 5,101,784 | A * | 4/1992 | Tamaki | 123/337 |
| 5,178,112 | A * | 1/1993 | Terazawa et al. | 123/399 |
| 5,215,057 | A * | 6/1993 | Sato et al. | 123/400 |
| 5,439,429 | A * | 8/1995 | Lee | 477/207 |
| 6,253,731 | B1 * | 7/2001 | Yoon | 123/396 |
| 7,475,670 | B2 * | 1/2009 | Sato et al. | 123/396 |
| 2010/0154742 | A1 * | 6/2010 | Scheuerell | 123/403 |

FOREIGN PATENT DOCUMENTS

| | | |
|---|---|---|
| JP | 1-247721 | 10/1989 |
| JP | 5-86912 | 4/1993 |
| KR | 10-0463069 | 12/2004 |

OTHER PUBLICATIONS

Publication of Application dated Feb. 16, 2010, for Korean Patent No. 10-0942590.

* cited by examiner

*Primary Examiner* — Stephen K Cronin
*Assistant Examiner* — Sizo Vilakazi
(74) *Attorney, Agent, or Firm* — Lowe Hauptman Ham & Berner, LLP

(57) ABSTRACT

The present invention relates to a device for preventing sudden acceleration of an automobile that is installed in a power transmission structure disposed between a throttle valve and a motor for the throttle valve in the automobile, such that if the motor is activated by an electrical error at a state where an accelerator pedal is not depressed by a driver, the power generated from the motor is not transmitted to the throttle valve. The device for preventing sudden acceleration of an automobile fitted with an automatic transmission according to the present invention is configured wherein even though a motor opening and closing a throttle valve is activated by an electrical error at a state where an accelerator pedal is not depressed by a driver, the power generated from the motor is not transmitted mechanically to the throttle valve, thereby preventing casualty caused by sudden acceleration.

5 Claims, 4 Drawing Sheets

DEVICE FOR PREVENTING SUDDEN ACCELERATION OF AUTOMOBILE

CROSS REFERENCE TO RELATED APPLICATION

This application claims the priority of Korean Patent Application No. 10-2009-0130743, filed on Dec. 24, 2009 in the KIPO (Korean Intellectual Property Office), the disclosure of which are incorporated herein in their entirety by reference.

TECHNICAL FIELD

The present invention relates to a device for preventing sudden acceleration of an automobile that is installed in a power transmission structure disposed between a throttle valve and a motor for the throttle valve in the automobile, such that if the motor is activated by an electrical error at a state where an accelerator pedal is not depressed by a driver, the power generated from the motor is not transmitted to the throttle valve. More particularly, the present invention relates to a device for preventing sudden acceleration of an automobile fitted with an automatic transmission, such that even though a motor opening and closing a throttle valve is activated by an electrical error at a state where an accelerator pedal is not depressed by a driver, the power generated from the motor is not transmitted mechanically to the throttle valve, thereby preventing casualty caused by sudden acceleration.

BACKGROUND ART

Generally, if an accelerator pedal in an automobile is depressed by a driver, a throttle valve is opened to supply air to an engine, and then, as a quantity of air supplied is increased, a quantity of fuel to be supplied is increased. Thus, the revolutions per minute (rpm) of the engine is abruptly raised, which accelerates the engine.

Recently, with the wide application of an electronic control system through an electronic control unit (ECU) to a variety of types of automobiles, sudden acceleration often happens in the automobiles fitted with an automatic transmission. The electronic control unit is dynamically adopted in a variety of ranges such as engine control for fuel injection, ignition timing and mixture supply, a brake system, a transmission, and the like.

Based upon the quantity of air supplied, an electronic control engine carries out the fuel injection to make an appropriate air-fuel ratio, thereby obtaining desired engine output and further accomplishing fuel saving and exhaust gas reduction. Clear causes of the sudden acceleration occurring by the mounting of the electronic control engine and the electronic control automatic transmission on the automobile have been not reported yet. In most cases, however, erroneous operations (which are generally caused by the generation of electromagnetic waves or the production of noises from a secondary voltage upon ignition) may be made during the signal transmission process between the electronic control unit and the automatic transmission control unit (TCU), and thus, even though the accelerator pedal is not depressed at an initial start-up, or at a drive or rear position, the rpm of the engine is drastically raised to cause the sudden acceleration irrespective of the driver's intention.

Many endeavors to prevent the sudden acceleration of the automobile have been made, but no fundamental solution is suggested yet. As a result, unfortunately, the loss of life and property has been enormously increased.

DISCLOSURE

Technical Problem

Accordingly, the present invention has been made in view of the above-mentioned problems occurring in the prior art, and it is an object of the present invention to provide a device for preventing sudden acceleration of an automobile that is capable of mechanically blocking the transmission of the power from a motor opening and closing a throttle valve to the throttle valve, even if the motor is activated by an electrical error in a state where an accelerator pedal is not depressed, thereby preventing casualty caused by sudden acceleration.

Technical Solution

To achieve the above object, according to the present invention, there is provided a device for preventing sudden acceleration of an automobile in a structure wherein if an accelerator pedal is depressed, a motor is activated to transmit the power generated therefrom to a valve shaft, and the valve shaft is rotated to open a throttle valve, thereby adjusting a quantity of air supplied to an engine, the device including: a power transmission shaft disposed between the motor and the valve shaft and having one end connected to a shaft of the motor and the other end connected to the valve shaft in such a manner as to be rotated by receiving the power from the motor and transmit the power obtained by the rotation to the valve shaft; a fixed rotary member coupled along a portion of the power transmission shaft in such a manner as to be rotated around the power transmission shaft and be not moved forwardly and backwardly together with the power transmission shaft, the fixed rotary member being connected at a portion thereof to the accelerator pedal by means of a wire, such that if the accelerator pedal is depressed, the fixed rotary member is rotated together with the power transmission shaft in a direction capable of opening the throttle valve, and if the accelerator pedal is released, the fixed rotary member is rotated reversely to return to its original position; and a moving rotary member fixedly coupled along a portion of the power transmission shaft in such a manner as to be operated together with the power transmission shaft and disposed to be brought into close contact with the fixed rotary member, such that if the motor is activated in a state where the accelerator pedal is depressed, the moving rotary member is rotated together with the fixed rotary member, and if the motor is activated in a state where the accelerator pedal is not depressed, the moving rotary member is spaced apart from the fixed rotary member to cause the power transmission shaft to be moved, thereby preventing the transmission of the power from the power transmission shaft to the valve shaft.

According to the present invention, preferably, the power transmission shaft has a connection rod extended integrally to the front side thereof and a rod insertion groove formed at the rear side thereof; the motor has a rod fixedly coupled to a shaft formed at one side thereof, the rod being inserted into the rod insertion groove of the power transmission shaft and operated together with the power transmission shaft; and the valve shaft is connected to a connection block having a connection rod insertion groove into which the connection rod is selectively inserted; and the power transmission shaft has a spring disposed between the rear end thereof and a coupler connecting the rod to the shaft of the motor, thereby allowing the connection rod to be insertedly coupled to the connection rod insertion groove by means of the elastic force generated from the spring, wherein if the moving rotary member and the fixed rotary member are brought into close contact with each other, the connection rod of the power transmission shaft is insertedly coupled to the connection rod insertion groove of the connection block by means of the elastic force of the spring to transmit the power of the power transmission shaft to the valve shaft, and if the moving rotary member is spaced apart from the fixed rotary member, the connection rod escapes from the connection rod insertion groove to prevent the transmission of the power of the power transmission shaft to the valve shaft.

According to the present invention, preferably, the fixed rotary member has locking grooves formed at the both sides of one surface brought into close contact with the moving rotary member, and the moving rotary member has locking projections formed on one surface brought into close contact with the fixed rotary member in such a manner as to be insertedly coupled correspondingly to the locking grooves of the fixed rotary member, the locking grooves having inclined faces formed on one side surfaces thereof in such a manner as to be slant from the inside to the outside thereof in the opposite direction to each other, and the locking projections having inclined faces slantly formed correspondingly to the inclined faces of the locking grooves, such that if only the moving rotary member is rotated in a state where the fixed rotary member is fixed, the inclined faces of the locking projections of the moving rotary member are moved along the inclined faces of the locking grooves of the fixed rotary member to cause the moving rotary member to be spaced apart from the fixed rotary member.

ADVANTAGEOUS EFFECT

When the sudden acceleration safety device according to the present invention is applied to an automobile equipped with an automatic transmission, even though the motor opening and closing the throttle valve is operated by the electrical error in the state where the accelerator pedal is not depressed, the transmission of the power from the motor to the throttle valve is mechanically cut off, thereby preventing casualty caused by sudden acceleration.

MODE FOR INVENTION

Figure 1:
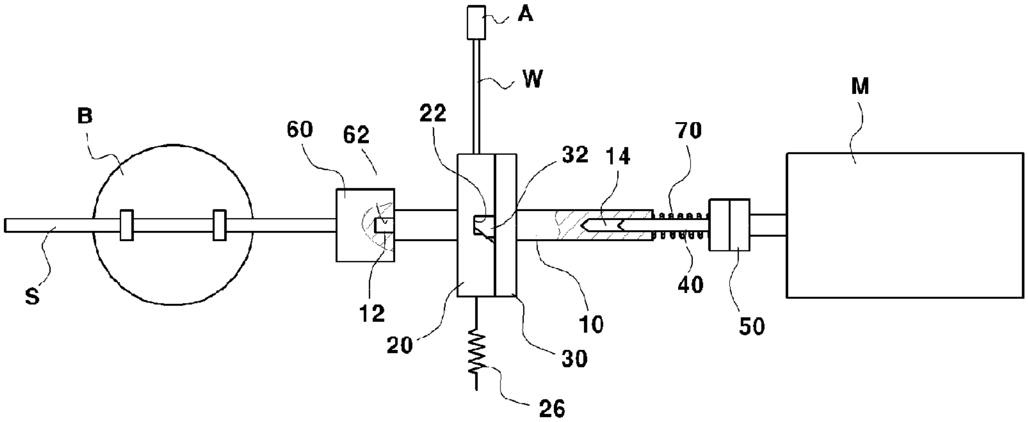
FIG. 1 is a plan view showing a device for preventing sudden acceleration of an automobile according to the present invention.
Figure 4:
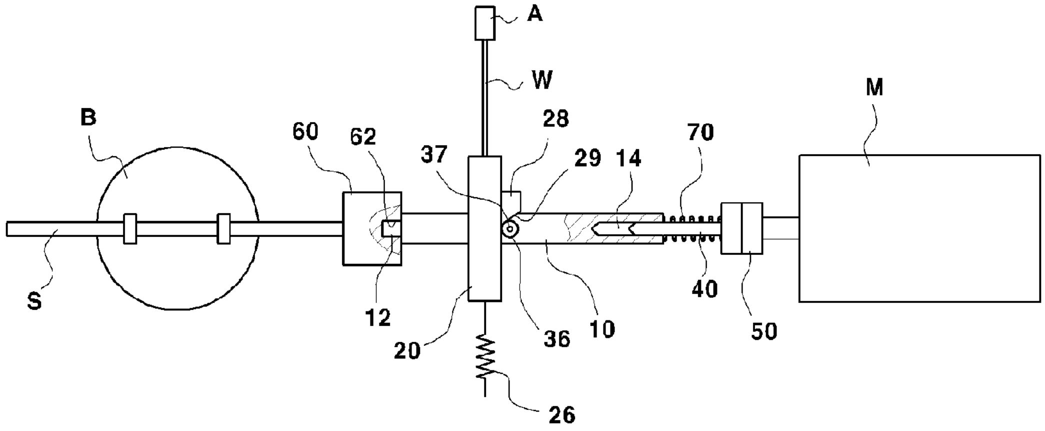
FIG. 4 is a plan view showing another structure in which the fixed rotary member and the moving rotary member are spaced apart from each other in the device for preventing sudden acceleration of an automobile according to the present invention.
Figure 5:
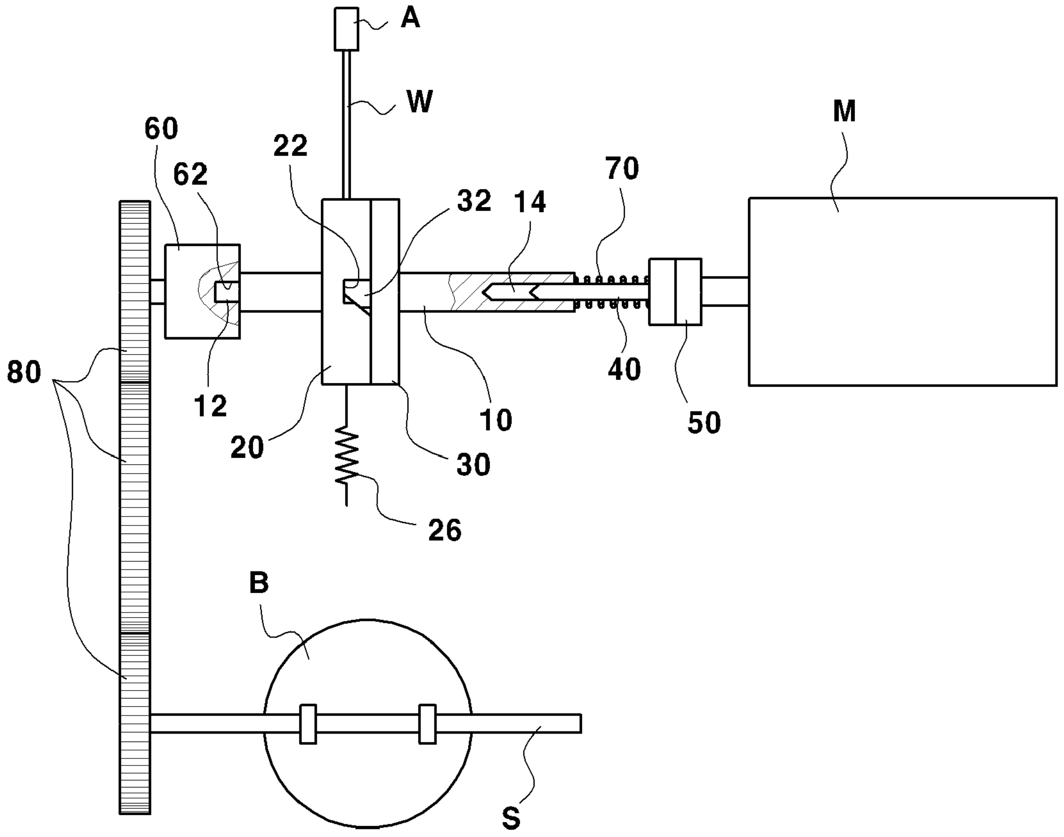
FIG. 5 is a plan view showing another connection structure of the power transmission shaft in the device for preventing sudden acceleration of an automobile according the present invention.
Figure 6:
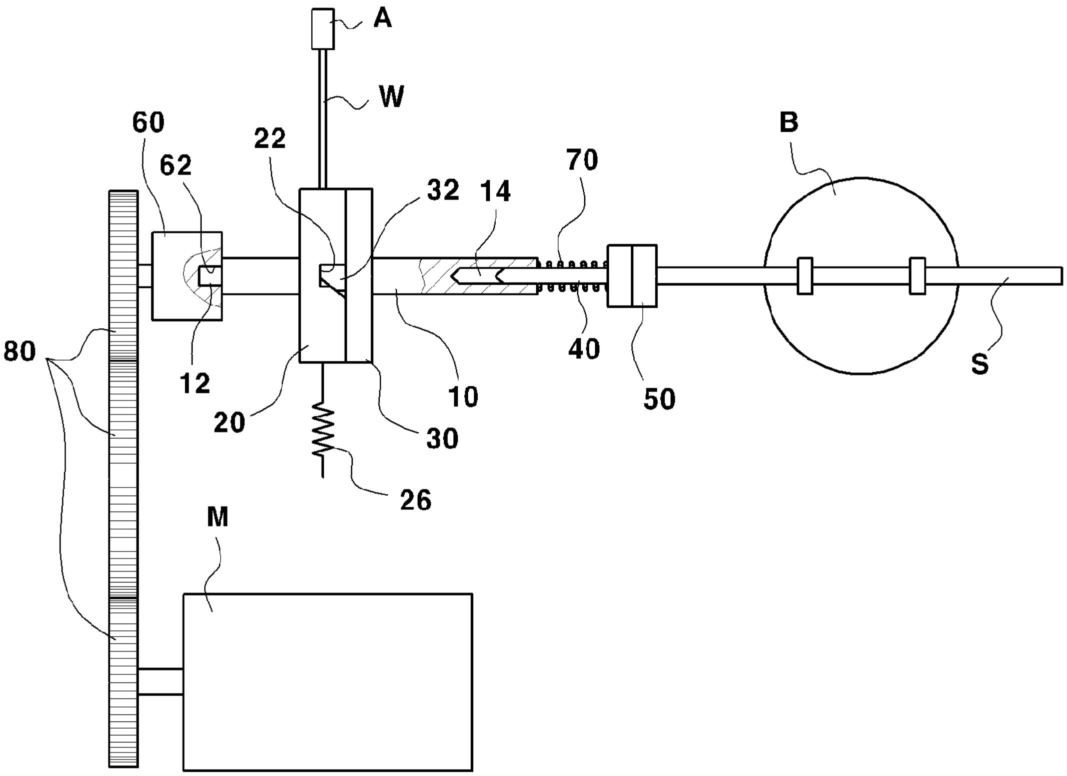
FIG. 6 is a plan view showing still another connection structure of the power transmission shaft in the device for preventing sudden acceleration of an automobile according the present invention.

Hereinafter, an explanation on a device for preventing sudden acceleration of an automobile according to the preferred embodiments of the present invention will be given in detail with reference to the attached drawings. FIG. 1 is a plan view showing a device for preventing sudden acceleration of an automobile according to the present invention, FIG. 2 is a separated perspective view showing a fixed rotary member and a moving rotary member in FIG. 1, FIG. 3 is a sectional view showing an operating state of the device for preventing sudden acceleration of an automobile according to the present invention, FIG. 4 is a plan view showing another structure in which the fixed rotary member and the moving rotary member are spaced apart from each other in the device for preventing sudden acceleration of an automobile according to the present invention, FIG. 5 is a plan view showing another connection structure of the power transmission shaft in the device for preventing sudden acceleration of an automobile according the present invention, and FIG. 6 is a plan view showing still another connection structure of the power transmission shaft in the device for preventing sudden acceleration of an automobile according the present invention.

Figure 2:
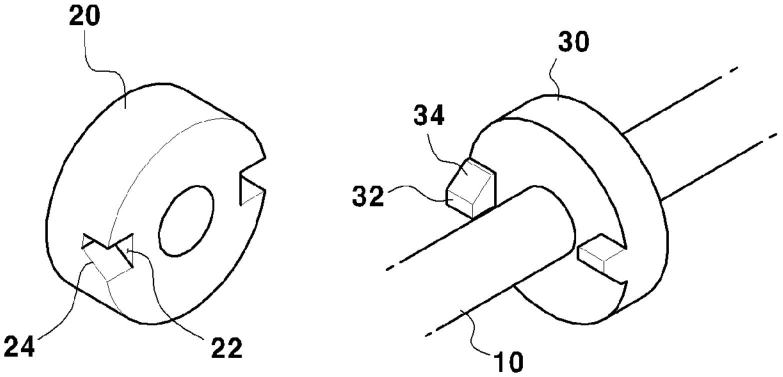
FIG. 2 is a separated perspective view showing a fixed rotary member and a moving rotary member in FIG. 1.
Figure 3:
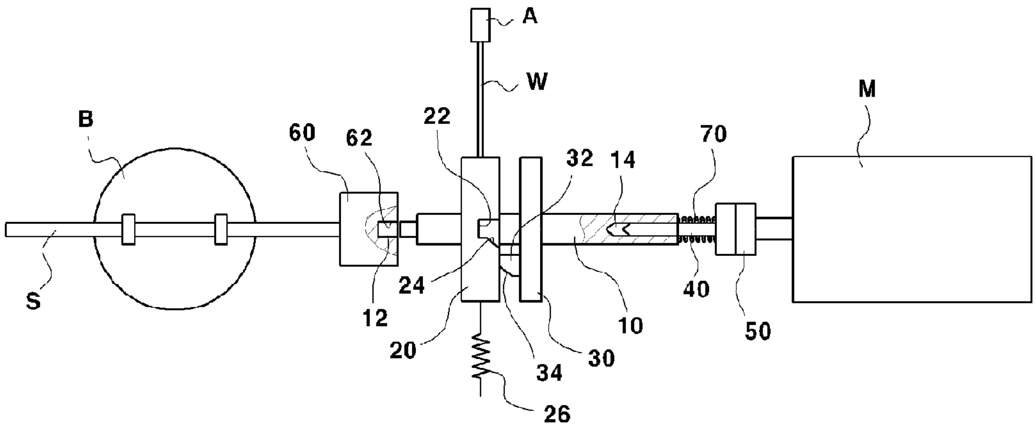
FIG. 3 is a sectional view showing an operating state of the device for preventing sudden acceleration of an automobile according to the present invention.

Referring to FIGS. 1 to 3, a device for preventing sudden acceleration of an automobile according the present invention is installed on a throttle valve in the automobile fitted with an automatic transmission adopting electronic control system through an electronic control unit, and if a motor M of the throttle valve is automatically activated by an electrical error in a state where an accelerator pedal is not depressed by a driver, the sudden acceleration safety device mechanically prevents the power of the motor M from being transmitted to a valve shaft S opening/closing a throttle valve B.

The device for preventing sudden acceleration of an automobile according the present invention is installed between the motor M and the valve shaft S for the throttle valve B, and basically, the device includes a power transmission shaft 10, a fixed rotary member 20 and a moving rotary member 30.

First, the power transmission shaft 10, which is disposed between the motor M and the valve shaft S, is connected to a shaft of the motor M at one end thereof and to the valve shaft S at the other end thereof. In this configuration, the power transmission shaft 10 receives the power from the motor M and is rotated to make the valve shaft S rotated, thereby finally opening and closing the throttle valve B. In this case, the power transmission shaft 10 connecting the motor M and the valve shaft S to each other is configured wherein if it moves forwardly, the shaft of the motor M and the valve shaft S are connected to allow the power from the motor M to be transmitted to the valve shaft S, and contrarily, if it moves backwardly, the power from the motor M is not transmitted to the valve shaft S.

In more detail, as shown in FIG. 1, the power transmission shaft 10 has a connection rod 12 extended integrally to the front side thereof and a rod insertion groove 14 formed at the rear side thereof. Further, the shaft of the motor M has a rod 40 fixedly coupled thereto by means of a coupler 50, and the rod 40 is inserted into the rod insertion groove 14 and is operated together with the power transmission shaft 10. If the motor M is activated, in other words, the rod 40 is rotated to allow the power transmission shaft 10 to be rotated. At this time, it is desirable that the rod insertion groove 14 has a depth higher than the front end portion of the rod 40 to obtain a sufficient space into which the rod 40 is housed, upon the coupling between the rod 40 and the rod insertion groove 14, such that when the power transmission shaft 10 is moved backwardly, locking of the rod 40 to the rod insertion groove 14 is prevented. Also, the valve shaft S is connected to a connection block 60 having a connection rod insertion groove 62 into which the connection rod 12 is selectively inserted. That is, if the power transmission shaft 10 is rotated with the power from the motor M, the connection block 60, which is connected to the connection rod 12, is rotated to allow the valve shaft S to be rotated. Of course, if the connection rod 12 escapes separately from the connection rod insertion groove 62 of the connection block 60, the transmission of the power of the motor M is cut off, such that even though the motor M is operated, the valve shaft S is not operated. Furthermore, the power transmission shaft 10 has a spring 70 mounted to provide an elastic force thereto, thereby allowing the connection rod 12 to be insertedly coupled to the connection rod insertion groove 62. In this case, desirably, the spring 70 is disposed between the rear end of the power transmission shaft 10 and the coupler 50, thereby elastically pressurizing the power transmission shaft 10.

On the other hand, as shown in FIG. 5, in another connection configuration of the power transmission shaft 10 according to the present invention, a plurality of deceleration gears 80 is additionally disposed between the connection block 60 and the valve shaft S, such that when the power from the motor M is transmitted to the valve shaft S through the power transmission shaft 10, the power is transmitted via the plurality of deceleration gears 80 before reaching the valve shaft S.

Additionally, as shown in FIG. 6, another connection configuration of the power transmission shaft 10 according to the present invention is made wherein the positions of the motor M and the valve shaft S are opposite to those in FIG. 5. That is, the plurality of deceleration gears 80 is mounted to the shaft of the motor M and is connected to the connection block 60. After that, the connection rod 12 of the power transmission shaft 10 is insertedly coupled to the connection rod insertion groove 62 of the connection block 60, and the rod 40 to be inserted into the rod insertion groove 14 of the power transmission shaft 10 is connected to the valve shaft S by means of the coupler 50. Then, the spring 70 is disposed between the rear end of the power transmission shaft 10 and the coupler 50.

As described above, the present invention may have a variety of connection configurations of the power transmission shaft 10, on the condition wherein if the power transmission shaft 10 moves forwardly, the power from the motor M is transmitted to the valve shaft S, and if it moves backwardly, the transmission of the power from the motor M to the valve shaft S is cut off.

Next, the fixed rotary member 20 is coupled along a portion of the power transmission shaft 10, which is rotated around the power transmission shaft 10 and is not moved forwardly and backwardly together with the power transmission shaft 10. Further, the fixed rotary member 20 is connected at a portion thereof to an accelerator pedal A by means of a wire W, and if the accelerator pedal A is depressed, the fixed rotary member 20 is rotated together with the power transmission shaft 10 to allow the throttle valve B to be opened. If the accelerator pedal A is released, the fixed rotary member 20 is rotated reversely to return to its original position. In this case, the reversing rotation of the fixed rotary member 20 to return to its original position may be configured in a variety of manners. For example, a return spring 26 is mounted at a portion of the fixed rotary member 20, and, in the state where the accelerator pedal A is depressed to rotate the fixed rotary member 20, if the accelerator pedal A is released, the return spring 26 helps the fixed rotary member 20 to be rotated reversely to return to its original position. Of course, the return spring 26 may be disposed at the same portion as the accelerator pedal A connected by means of the wire W to the fixed rotary member 20.

Next, the moving rotary member 30 is fixedly coupled along a portion of the power transmission shaft 10 and is operated together with the power transmission shaft 10. Further, the moving rotary member 30 is disposed to be brought into close contact with the fixed rotary member 20, and if the motor M is operated in the state where the accelerator pedal A is depressed, the moving rotary member 30 is rotated together with the fixed rotary member 20, and contrarily, if the motor M is operated in the state where the accelerator pedal A is not depressed, the moving rotary member 30 is spaced apart from the fixed rotary member 20 to cause the power transmission shaft 10 to be moved backwardly, thereby making it impossible to transmit the power from the power transmission shaft 10 to the valve shaft S. In this case, the structure of separating the moving rotary member 30 from the fixed rotary member 20 is possibly made in a variety of manners, on the conditions that if the fixed rotary member 20 is rotated during the rotation of the moving rotary member 30, the two members are not spaced apart from each other, but if the fixed rotary member 20 is not rotated during the rotation of the moving rotary member 30, they are spaced apart from each other.

For instance, as shown in FIG. 1, in the separating structure between the moving rotary member 30 and the fixed rotary member 20, the fixed rotary member 20 has locking grooves 22 formed at the both sides of one surface brought into close contact with the moving rotary member 30, and the moving rotary member 30 has locking projections 32 formed on one surface brought into close contact with the fixed rotary member 20 in such a manner as to be insertedly coupled correspondingly to the locking grooves 22 of the fixed rotary member 20. The locking grooves 22 have inclined face 24 formed on one side surface thereof in such a manner as to be slant from the inside to the outside thereof in the opposite direction to each other, and the locking projections 32 have inclined faces 34 slantly formed correspondingly to the inclined faces 24 of the locking grooves 22. Accordingly, the rotation of the fixed rotary member 20 together with the rotation of the moving rotary member 30 does not matter, but if only the moving rotary member 30 is rotated in the state where the fixed rotary member 20 is fixed, the inclined faces 34 of the locking projections 32 of the moving rotary member are moved along the inclined faces 24 of the locking grooves 22 of the fixed rotary member 20 to cause the moving rotary member 30 to be spaced apart from the fixed rotary member 20. In this case, the positions of the locking grooves 22 and the locking projections 32 may be formed opposite to each other, and the positions of the inclined faces 24 and the inclined faces 34 may be determined in accordance with the rotating direction of the moving rotary member 30.

On the other hand, as shown in FIG. 4, the structure of moving the power transmission shaft 10 may be made by adopting a roller thereto. That is, the fixed roller member 20 has a protruding piece 28 formed on one surface thereof, the protruding piece 28 having an inclined face 29 slantly formed downwardly from a lower portion thereof, and the power transmission shaft 10 has a roller 36 mounted to one face thereof, the roller 35 being adapted to be moved along the inclined face 29 of the protruding piece 28. In more detail, the roller 36 is fixed by means of a pin 37 to the power transmission shaft 10 and is operated together with the power transmission shaft 10, while being rotatable around the pin 37. Also, the roller 36 is formed to be brought into close contact with the underside of the inclined face 29 of the protruding piece 28 of the fixed rotary member 20, and thus, if the motor M is operated in the state where the accelerator pedal A is not depressed by a driver, the roller 36 is moved along the inclined face 29 formed on the protruding piece 28 of the fixed rotary member 20 to cause the power transmission shaft 10 to be moved backwardly, such that the power transmission shaft 10 is separated from the valve shaft S, thereby making it impossible to transmit the power from the motor M to the valve shaft S.

As mentioned above, the characteristics of the device for preventing sudden acceleration of an automobile according to the present invention are placed wherein if the motor M is operated in the state where the accelerator pedal A is not depressed by a driver, the power transmission shaft 10 is moved backwardly to prevent the power from the motor M from being transmitted to the valve shaft S. In addition thereto, of course, a variety of embodiments may be adopted.

Referring now to the operations and effects of the device for preventing sudden acceleration of an automobile according to the present invention, if the accelerator pedal A is depressed by a driver in order to start the driving of his or her automobile, the fixed rotary member 20 is pulled by means of the wire W connected to the accelerator pedal A and is rotated to a predetermined angle. At the same time, the motor M of the throttle valve B is activated to rotate the valve shaft S by means of the rotation of the power transmission shaft 10, thereby opening the throttle valve B. Thus, air is supplied to an engine to make a combustible state kept. Of course, a quantity of air supplied to the engine is adjusted by the depressing degree of the accelerator pedal A, and if the accelerator pedal A is released, the fixed rotary member 20 is rotated reversely by means of the return spring 26 to return to its original position. Accordingly, the motor M is rotated reversely to close the throttle valve B.

While the automobile is normally driven, the device for preventing sudden acceleration of an automobile according to the present invention is operated like the manners as mentioned above, but if the motor M is operated to open the throttle valve B in the state where the accelerator pedal A is not depressed by means of the electrical error occurring in the automobile, the power transmission shaft 10 is separated from the valve shaft S, thereby preventing the transmission of the power from the motor M to the valve shaft S. In other words, if the accelerator pedal A is not depressed, the fixed rotary member 20 is not moved, and in this state, if the motor M is operated to rotate the power transmission shaft 10, the moving rotary member 30 fixed along the power transmission shaft 10 is spaced apart from the fixed rotary member 20 to allow the power transmission shaft 10 to be moved backwardly, such that the connection rod of the power transmission shaft 10 escapes from the connection rod insertion groove 62 of the connection block 60, thereby separating the power transmission shaft 10 from the valve shaft S. Accordingly, even though the power transmission shaft 10 is rotated by receiving the power from the motor M, the power is not transmitted to the connection block 60, thereby preventing the rotation of the valve shaft S and maintaining the closing state of the throttle valve B. If the motor M is returned to its normal state by removing the electrical error occurring in the automobile, of course, the connection rod 12 of the power transmission shaft 10 is inserted into the connection rod insertion groove 62 of the connection block 60 by means of the restoring force of the spring 70, thereby making it possible to transmit the power from the motor M to the valve shaft S.

As set forth in the foregoing, in case of the device for preventing sudden acceleration of an automobile according to the present invention, if the accelerator pedal is depressed by a driver, the automobile is normally operated, but if the motor opening and closing the throttle valve is operated by the electrical error in the state where the accelerator pedal is not depressed, the transmission of the power from the motor to the throttle valve is mechanically cut off, thereby preventing casualty caused by sudden acceleration.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A device for preventing sudden acceleration of an automobile in a structure wherein if an accelerator pedal is depressed, a motor is activated to transmit the power generated therefrom to a valve shaft, and the valve shaft is rotated to open a throttle valve, thereby adjusting a quantity of air supplied to an engine, the device comprising:

a power transmission shaft disposed between the motor and the valve shaft and having one end connected to a shaft of the motor and the other end connected to the valve shaft in such a manner as to be rotated by receiving the power from the motor and transmit the power obtained by the rotation to the valve shaft;

a fixed rotary member coupled along a portion of the power transmission shaft in such a manner as to be rotated around the power transmission shaft and be not moved forwardly and backwardly together with the power transmission shaft, the fixed rotary member being connected at a portion thereof to the accelerator pedal by means of a wire, such that if the accelerator pedal is depressed, the fixed rotary member is rotated together with the power transmission shaft in a direction capable of opening the throttle valve, and if the accelerator pedal is released, the fixed rotary member is rotated reversely to return to its original position; and a moving rotary member fixedly coupled along a portion of the power transmission shaft in such a manner as to be operated together with the power transmission shaft and disposed to be brought into close contact with the fixed rotary member, such that if the motor is activated in a state where the accelerator pedal is depressed, the moving rotary member is rotated together with the fixed rotary member, and if the motor is activated in a state where the accelerator pedal is not depressed, the moving rotary member is spaced apart from the fixed rotary member to cause the power transmission shaft to be moved, thereby preventing the transmission of the power from the power transmission shaft to the valve shaft.

2. The device for preventing sudden acceleration of an automobile according to claim 1, wherein the power transmission shaft has a connection rod extended integrally to the front side thereof and a rod insertion groove formed at the rear side thereof; the motor has a rod fixedly coupled to a shaft formed at one side thereof, the rod being inserted into the rod insertion groove and operated together with the power transmission shaft; and the valve shaft is connected to a connection block having a connection rod insertion groove into which the connection rod is selectively inserted; and the power transmission shaft has a spring disposed between the rear end thereof and a coupler connecting the rod to the shaft of the motor, thereby allowing the connection rod to be insertedly coupled to the connection rod insertion groove by means of the elastic force generated from the spring, wherein if the moving rotary member and the fixed rotary member are brought into close contact with each other, the connection rod of the power transmission shaft is insertedly coupled to the connection rod insertion groove of the connection block by means of the elastic force of the spring to transmit the power of the power transmission shaft to the valve shaft, and if the moving rotary member is spaced apart from the fixed rotary member, the connection rod escapes from the connection rod insertion groove to prevent the transmission of the power of the power transmission shaft to the valve shaft.

3. The device for preventing sudden acceleration of an automobile according to claim 1, wherein the fixed rotary member has locking grooves formed at the both sides of one surface brought into close contact with the moving rotary member, and the moving rotary member has locking projections formed on one surface brought into close contact with the fixed rotary member in such a manner as to be insertedly coupled correspondingly to the locking grooves of the fixed rotary member, the locking grooves having inclined faces formed on one side surfaces thereof in such a manner as to be slant from the inside to the outside thereof in the opposite direction to each other, and the locking projections having inclined faces slantly formed correspondingly to the inclined faces of the locking grooves, such that if only the moving rotary member is rotated in a state where the fixed rotary member is fixed, the inclined faces of the locking projections of the moving rotary member are moved along the inclined faces of the locking grooves of the fixed rotary member to cause the moving rotary member to be spaced apart from the fixed rotary member.

4. The device for preventing sudden acceleration of an automobile according to claim 1, wherein the fixed rotary member comprises a return spring mounted at a portion thereof, such that in the state where the accelerator pedal is depressed to rotate the fixed rotary member, if the accelerator pedal is released, the fixed rotary member is rotated reversely to return to its original position.

5. The device for preventing sudden acceleration of an automobile according to claim 2, wherein the fixed rotary member has locking grooves formed at the both sides of one surface brought into close contact with the moving rotary member, and the moving rotary member has locking projections formed on one surface brought into close contact with the fixed rotary member in such a manner as to be insertedly coupled correspondingly to the locking grooves of the fixed rotary member, the locking grooves having inclined faces formed on one side surfaces thereof in such a manner as to be slant from the inside to the outside thereof in the opposite direction to each other, and the locking projections having inclined faces slantly formed correspondingly to the inclined faces of the locking grooves, such that if only the moving rotary member is rotated in a state where the fixed rotary member is fixed, the inclined faces of the locking projections of the moving rotary member are moved along the inclined faces of the locking grooves of the fixed rotary member to cause the moving rotary member to be spaced apart from the fixed rotary member.

* * * * *